US012591663B2

(12) United States Patent
Kanai et al.

(10) Patent No.: US 12,591,663 B2
(45) Date of Patent: Mar. 31, 2026

(54) INFORMATION PROCESSING DEVICE, INFORMATION PROCESSING METHOD, AND INFORMATION PROCESSING COMPUTER PROGRAM PRODUCT

(71) Applicant: KABUSHIKI KAISHA TOSHIBA, Tokyo (JP)

(72) Inventors: Jun Kanai, Tokyo (JP); Fumihiko Sano, Kawasaki (JP); Yurie Shinke, Kawasaki (JP)

(73) Assignee: KABUSHIKI KAISHA TOSHIBA, Kawasaki (JP)

( * ) Notice: Subject to any disclaimer, the term of this patent is extended or adjusted under 35 U.S.C. 154(b) by 270 days.

(21) Appl. No.: 18/456,727

(22) Filed: Aug. 28, 2023

(65) Prior Publication Data

US 2024/0241946 A1 Jul. 18, 2024

(30) Foreign Application Priority Data

Jan. 17, 2023 (JP) ................................. 2023-005384

(51) Int. Cl.
*G06F 21/55* (2013.01)

(52) U.S. Cl.
CPC .................................. *G06F 21/552* (2013.01)

(58) Field of Classification Search
CPC ...................................................... G06F 21/552
See application file for complete search history.

(56) References Cited

U.S. PATENT DOCUMENTS

2010/0205651 A1   8/2010  Yanoo et al.
2010/0332991 A1*  12/2010  Banerjee ................. H04L 41/12
                                             709/224

2012/0016714 A1*  1/2012  Apte ...................... G06Q 10/06
                                             705/7.28
2013/0215769 A1*  8/2013  Beheshti-Zavareh .........................
                                             H04L 41/0663
                                             370/252
2020/0106801 A1   4/2020  Evans
2021/0021628 A1*  1/2021  Sbandi ................... H04L 63/20
                    (Continued)

FOREIGN PATENT DOCUMENTS

JP           6324646 B1    5/2018
JP      2021-157401 A    10/2021
                    (Continued)

OTHER PUBLICATIONS

Japan Patent Office, Office Action in JP App. No. 2023-005384 (Jun. 24, 2025).

*Primary Examiner* — Trong H Nguyen
*Assistant Examiner* — Samikshya Poudel
(74) *Attorney, Agent, or Firm* — Finnegan, Henderson, Farabow, Garrett & Dunner, LLP

(57) ABSTRACT

An information processing device includes a first acquisition unit, a calculation unit, and a selection unit. The first acquisition unit acquires resilience requirements for a target system. For each of the action sets including one action or the combination of the actions and being different from each other for the resilience, the calculation unit calculates the resilience indicator of the target system to which an action set is applied. Based on the resilience indicator calculated for each of the action sets, the selection unit selects the action set satisfying the resilience requirements among the action sets, as the resilience design information.

7 Claims, 13 Drawing Sheets

(56)      References Cited

U.S. PATENT DOCUMENTS

| | | | |
|---|---|---|---|
| 2021/0144163 A1 | 5/2021 | Sloane et al. | |
| 2021/0303697 A1 | 9/2021 | Fujita et al. | |
| 2021/0342210 A1* | 11/2021 | Balasubramanian | ........................ G06F 11/0793 |
| 2022/0179966 A1 | 6/2022 | Shinke et al. | |
| 2023/0370490 A1* | 11/2023 | Crabtree | ............. H04L 63/1433 |
| 2024/0089284 A1* | 3/2024 | Rieger | ................ H04L 63/1433 |
| 2024/0282052 A1 | 8/2024 | Mizushima et al. | |
| 2024/0403429 A1* | 12/2024 | Kuroda | ................... G06F 21/57 |

FOREIGN PATENT DOCUMENTS

| | | | |
|---|---|---|---|
| JP | 2022-89573 A | 6/2022 | |
| JP | 2022-165798 A | 11/2022 | |
| WO | WO 2015/177832 A1 | 11/2015 | |
| WO | WO 2022/264265 A1 | 12/2022 | |

* cited by examiner

FIG.2

CYBER RESILIENCE CATALOG

14A

| ACTION | RESILIENCE PARAMETER | | | INFLUENCE PARAMETER | | |
|---|---|---|---|---|---|---|
| | REDUCTION RATE OF ATTACK SUCCESS RATE | IMPROVEMENT RATE OF FUNCTION OPERATION RATE | IMPROVE-MENT RATE OF RETURN TIME | INITIAL COST | RUNNING COST | SYSTEM LOAD |
| FIREWALL | 50% | 0% | 0% | LOW | MEDIUM | LOW |
| ANTI-VIRUS | 30% | 0% | 0% | LOW | MEDIUM | MEDIUM |
| SOC | 20% | 0% | 30% | MEDIUM | HIGH | MEDIUM |
| BACKUP/RESTORE | 0% | 0% | 40% | LOW | LOW | LOW |
| FALLBACK | 0% | 50% | 0% | MEDIUM | LOW | LOW |
| DUPLICATION | 0% | 90% | 0% | HIGH | LOW | LOW |

FIG.3

RESILIENCE REQUIREMENTS

| KPI TARGET VALUE |
|---|
| KPI_rel<0.3 |

FIG.4

SYSTEM CONSTRAINT INFORMATION

| INITIAL COST | RUNNING COST | SYSTEM LOAD |
|---|---|---|
| REQUIREMENT: HIGH | REQUIREMENT: MEDIUM | REQUIREMENT: HIGH |

BEFORE INTRODUCTION OF
RESILIENCE ACTION

AFTER INTRODUCTION OF
RESILIENCE ACTION

FIG.6

| ACTION SET | RESILIENCE PARAMETER | | | RESILIENCE INDICATOR KPI_rel (WHEN XB=YB=ZB=1) | INFLUENCE PARAMETER | | | CON-STRAINT SUFFI-CIENCY SCORE | TOTAL RANKING |
|---|---|---|---|---|---|---|---|---|---|
| | REDUCTION RATE OF TOTAL ATTACK SUCCESS RATE | IMPROVE-MENT RATE OF TOTAL FUNCTION OPERATION RATE | IMPROVE-MENT RATE OF TOTAL RETURN TIME | | INITIAL COST SCORE | RUNNING COST SCORE | SYSTEM LOAD SCORE | | |
| ONLY FIREWALL | 50% | 0% | 0% | 0.5 | 0 | 0.3 | 0 | 0.3 | - |
| ONLY BACKUP/RESTORE | 0% | 0% | 40% | 0.6 | 0 | 0 | 0 | 0 | - |
| ONLY FALLBACK | 0% | 50% | 0% | 0.5 | 0.6 | 0 | 0 | 0.6 | - |
| ONLY DUPLICATION | 0% | 90% | 0% | 0.1 | 1 | 0 | 0 | 1 | SECOND |
| FIREWALL+FALLBACK | 50% | 50% | 0% | 0.25 | 0.6 | 0.3 | 0 | 0.9 | FIRST |
| | | | | ... | | | | | |

AFTER INTRODUCTION OF
RESILIENCE ACTION

14B

SCORE CONVERSION TABLE

| | | CONSTRAINT REQUIREMENT LEVEL | | |
|---|---|---|---|---|
| | | REQUIREMENT: HIGH | REQUIREMENT: MEDIUM | REQUIREMENT: LOW |
| INFLUENCE DEGREE REPRESENTED BY INFLUENCE PARAMETER | INFLUENCE: LARGE | 1 | 0.6 | 0 |
| | INFLUENCE: MEDIUM | 0.6 | 0.3 | 0 |
| | INFLUENCE: SMALL | 0 | 0 | 0 |

FIG.11

RESILIENCE REQUIREMENTS

|  | KPI TARGET VALUE |
|---|---|
| NODE 1 | KPI_rel<0.1 |
| NODE 2 | KPI_rel≤1 |
| NODE 3 | KPI_rel<0.14 |
| NODE 4 | KPI_rel≤1 |

FIG.12

SYSTEM CONSTRAINT INFORMATION

|  | INITIAL COST | RUNNING COST | SYSTEM LOAD |
|---|---|---|---|
| GROUP 1 (NODES 1, 3) | REQUIREMENT: LOW | REQUIREMENT: LOW | REQUIREMENT: HIGH |
| GROUP 2 (NODES 2, 4) | REQUIREMENT: HIGH | REQUIREMENT: LOW | REQUIREMENT: HIGH |

FIG.15

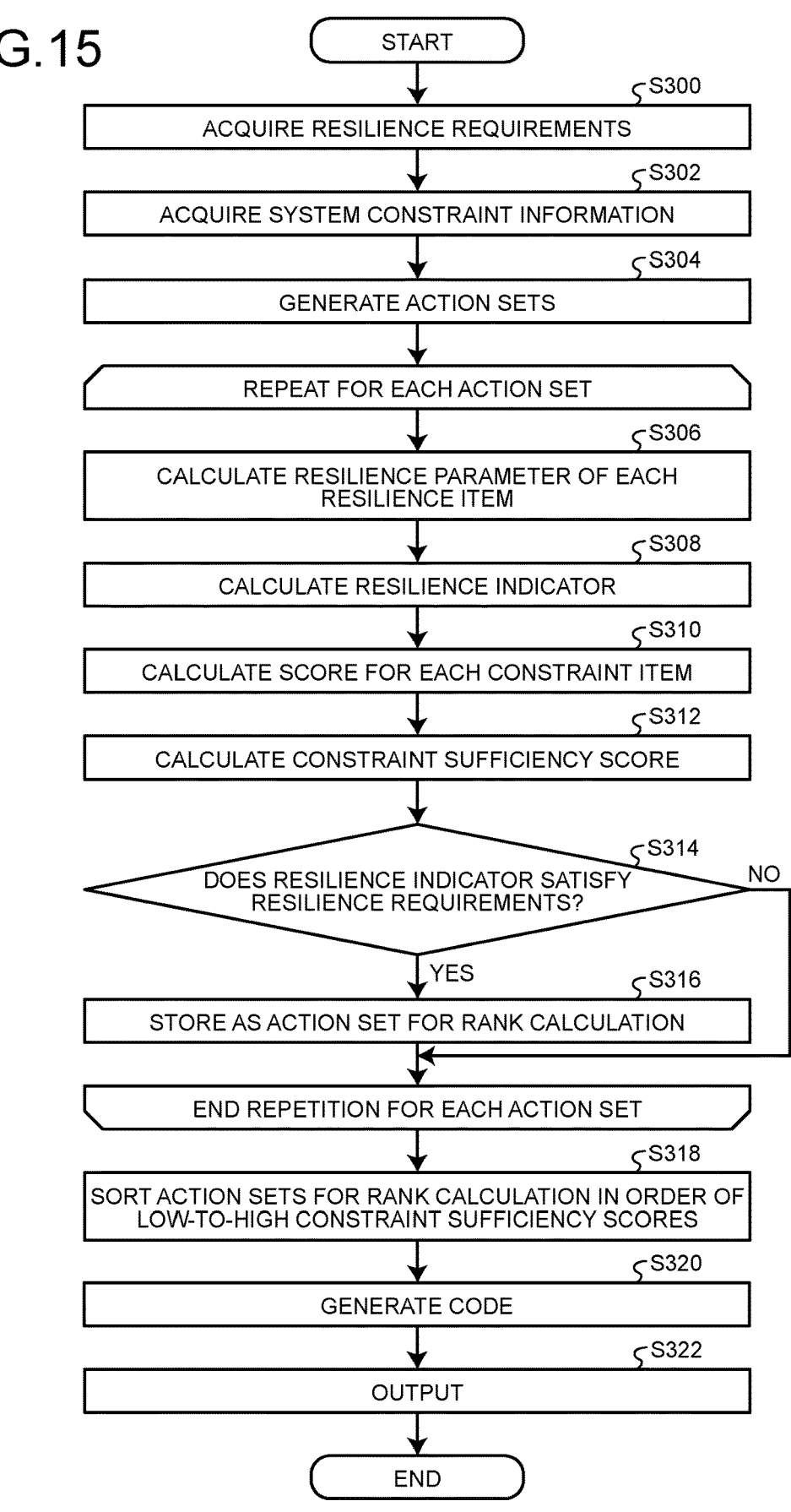

START

S300
ACQUIRE RESILIENCE REQUIREMENTS

S302
ACQUIRE SYSTEM CONSTRAINT INFORMATION

S304
GENERATE ACTION SETS

REPEAT FOR EACH ACTION SET

S306
CALCULATE RESILIENCE PARAMETER OF EACH RESILIENCE ITEM

S308
CALCULATE RESILIENCE INDICATOR

S310
CALCULATE SCORE FOR EACH CONSTRAINT ITEM

S312
CALCULATE CONSTRAINT SUFFICIENCY SCORE

S314
DOES RESILIENCE INDICATOR SATISFY RESILIENCE REQUIREMENTS?    NO

YES
S316
STORE AS ACTION SET FOR RANK CALCULATION

END REPETITION FOR EACH ACTION SET

S318
SORT ACTION SETS FOR RANK CALCULATION IN ORDER OF LOW-TO-HIGH CONSTRAINT SUFFICIENCY SCORES

S320
GENERATE CODE

S322
OUTPUT

END 10, 10B, 10C

INFORMATION PROCESSING DEVICE, INFORMATION PROCESSING METHOD, AND INFORMATION PROCESSING COMPUTER PROGRAM PRODUCT

CROSS-REFERENCE TO RELATED APPLICATIONS

This application is based upon and claims the benefit of priority from Japanese Patent Application No. 2023-005384, filed on Jan. 17, 2023; the entire contents of which are incorporated herein by reference.

FIELD

Embodiments described herein relate generally to an information processing device, an information processing method, and an information processing computer program product.

BACKGROUND

A resilience technology for, in the occurrence of an incident such as a disaster, attempting a quick recovery from the influence and restoration to a normal state has attracted attention. In addition, the concept of the cyber resilience technology that minimizes the influence in the occurrence of an incident such as cyberattack and attempts an early recovery from the influence is spreading. One of the disclosed examples is a technique of selecting the security action that produces the maximum effect with the minimum action.

In the conventional technique, however, the actions considering the resilience requirements of a target system have not been selected and the optimum resilience design information in accordance with the target system has not been provided.

BRIEF DESCRIPTION OF THE DRAWINGS

FIG. 2 is a schematic diagram of a data configuration of a cyber resilience catalog;

FIG. 3 is an explanatory diagram of resilience requirements;

FIG. 4 is a schematic diagram of system constraint information;

FIG. 6 is an explanatory diagram of calculating a first KPI absolute value;

FIG. 11 is an explanatory diagram of the resilience requirements;

FIG. 12 is a schematic diagram of system constraint information;

FIG. 15 is a flowchart expressing the procedure of information processing.

DETAILED DESCRIPTION

It is an object of the embodiments herein to provide an information processing device, an information processing method, and an information processing computer program product that can provide optimum resilience design information in accordance with a target system. According to an embodiment, an information processing device includes one or more hardware processors configured to function as a first acquisition unit, a calculation unit, and a selection unit. The first acquisition unit acquires a resilience requirement for a target system. The calculation unit calculates, for each of a plurality of action sets including one action or a combination of a plurality of actions and being different from each other for resilience, a resilience indicator of the target system to which an action set is applied. The selection unit selects, as resilience design information, the action set satisfying the resilience requirement among the action sets, based on the resilience indicator calculated for each of the action sets.

Exemplary embodiments of an information processing device, an information processing method, and an information processing computer program product will be explained below in detail with reference to the accompanying drawings.

In the description in each of the following embodiments, parts denoted by the same reference sign have substantially the same functions, and the overlapping parts are omitted from the description as appropriate.

First Embodiment

Figure 1:
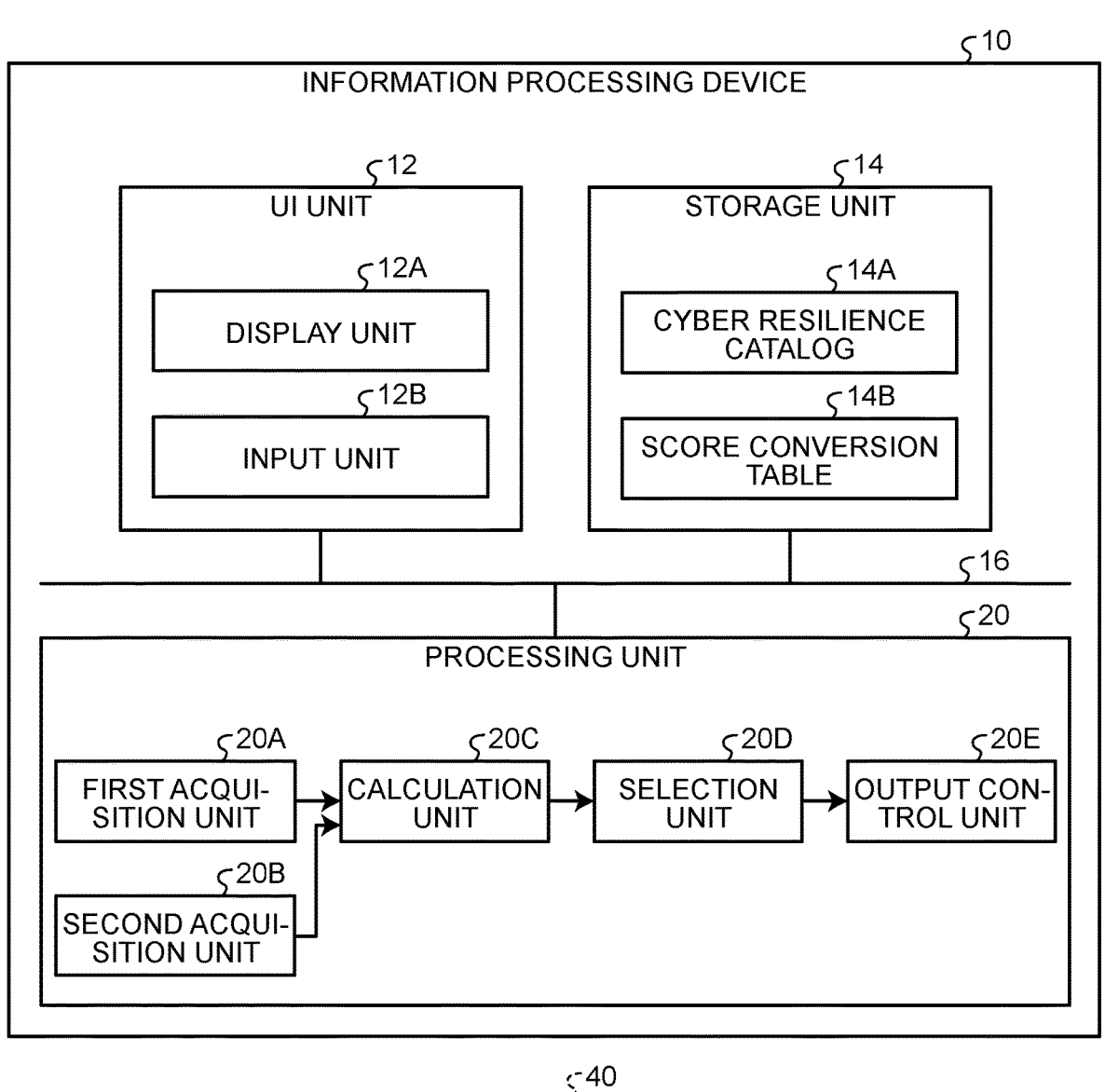
FIG. 1 is a schematic diagram of an information processing device.

FIG. 1 is a schematic diagram of one example of an information processing device 10 according to this embodiment.

The information processing device 10 is a computer that selects resilience design information for a target system 40.

The target system 40 is an information system to which an action set to satisfy resilience is applied. The target system 40 includes one or a plurality of nodes, for example.

The resilience refers to the mechanism or capability to, in the occurrence of an incident such as various cyberattacks, minimize the influence of the incident and to enable a quick recovery from the influence and restoration to the normal state.

The resilience design information and the action set are discussed below in detail.

The information processing device 10 includes a user interface (UI) unit 12, a storage unit 14, and a processing unit 20. The UI unit 12, the storage unit 14, and the processing unit 20 are communicatively connected via a bus 16 or the like.

The UI unit 12 has a display function for displaying various types of information and an inputting function for receiving operation instructions from a user. In this embodiment, the UI unit 12 includes a display unit 12A and an input unit 12B. The display unit 12A is a display that displays various types of information. The input unit 12B receives the operation input by the user. The input unit 12B is, for example, a pointing device such as a mouse or a keyboard.

The UI unit 12 may be a touch panel in which the display unit 12A and the input unit 12B are integrated.

The storage unit 14 stores various types of information. The storage unit 14 may be a storage device provided outside the information processing device 10. For example, the storage unit 14 may be mounted on an external information processing device connected to the information processing device 10 via a network or the like.

In this embodiment, the storage unit 14 stores therein a cyber resilience catalog 14A and a score conversion table 14B in advance.

The cyber resilience catalog 14A is information that represents a plurality of actions that satisfy the resilience against cyberattacks. The score conversion table 14B will be discussed below in detail.

FIG. 2 is a schematic diagram of one example of a data configuration of the cyber resilience catalog 14A.

The cyber resilience catalog 14A is information in which the actions, and resilience parameters and influence parameters corresponding to the respective actions are associated with each other.

The actions are security actions to satisfy the resilience against the cyberattacks. A plurality of types of actions are registered in advance in the cyber resilience catalog 14A.

The resilience parameter is a parameter that represents an improvement degree of resilience in a case where the corresponding action in the cyber resilience catalog 14A is introduced in a system, such as the target system 40. In the cyber resilience catalog 14A, values of the resilience parameters that represent the improvement degree of the resilience for each of a plurality of resilience items are registered.

The resilience items are items that represent the resilience in a case where the corresponding action is introduced in the system, such as the target system 40. Specifically, the resilience items include at least one-type item among items related to the attack success rate against a system such as the target system 40, items related to operation functions of a system such as the target system 40, and items related to a stop period of the target system 40 (for example, return time).

The items related to the attack success rate are, for example, the reduction rate of the attack success rate, the reduction rate of the stop possibility, and the like. One example of the items related to the operation functions is the improvement rate of the function operation rate. One example of the items related to the stop period is the improvement rate of the return time.

In this embodiment, it is assumed that the resilience items are the reduction rate of the attack success rate, the improvement rate of the function operation rate, and the improvement rate of the return time. Note that the resilience items are not limited to these items.

The influence parameter is a parameter that represents an influence degree, other than the resilience, occurring to the system, such as the target system 40 in a case where the action is introduced in the system. In the cyber resilience catalog 14A, the values of the influence parameters that represent the influence degree of each of a plurality of influence items in a case where the corresponding action is introduced in the system are registered. The influence item shall coincide with a constraint item to be described below.

Referring back to FIG. 1, the explanation is continued.

Next, the processing unit 20 is described. The processing unit 20 causes the information processing device 10 to execute information processing. The processing unit 20 includes a first acquisition unit 20A, a second acquisition unit 20B, a calculation unit 20C, a selection unit 20D, and an output control unit 20E.

The first acquisition unit 20A, the second acquisition unit 20B, the calculation unit 20C, the selection unit 20D, and the output control unit 20E are realized by, for example, one or a plurality of processors. For example, each of the above units may be realized by having a processor such as a central processing unit (CPU) execute a computer program, i.e., by software. Each of the above units may be realized by a processor such as a dedicated IC, i.e., hardware. Each of the above units may be realized using software and hardware in combination. When the processors are used, each processor may realize one of the units or two or more of the units. In another example, at least one of the above units may be provided in an external information processing device connected to the information processing device 10 via a network.

The first acquisition unit 20A acquires resilience requirements for the target system 40.

The resilience requirements represent requirements that are required for the target system 40 as the resilience. In other words, the resilience requirements represent the level of the resilience required for the target system 40. For example, the resilience requirements represent the level of the resilience that a user requires for the target system 40.

The first acquisition unit 20A acquires from the UI unit 12, the resilience requirements for the target system 40 that are input by the user's operation instruction of the UI unit 12, for example. The first acquisition unit 20A may acquire the resilience requirements for the target system 40 from an external information processing device connected to the information processing device 10 via a network or the like. The first acquisition unit 20A may acquire the resilience requirements for the target system 40, which are stored in the storage unit 14 in advance, by reading the resilience requirements from the storage unit 14.

FIG. 3 is an explanatory diagram of one example of the resilience requirements.

The resilience requirements are represented, for example, by target conditions to be satisfied by a key performance indicator (KPI).

KPI is a quantitative indicator used to measure the achievement of a target. In this embodiment, a smaller value of KPI means a higher evaluation value.

The target condition to be satisfied by KPI is expressed, for example, by a conditional expression using KPI. FIG. 3 expresses "KPI_rel<0.3" as an example of a conditional expression for the resilience requirements.

KPI_rel represents the KPI relative value. The KPI relative value is the ratio of the KPI absolute value after the introduction of the resilience action to the KPI absolute value before the introduction of the resilience action. The KPI absolute values represent the respective KPIs before and after the introduction of the resilience action.

In other words, in the example described in this embodiment, the first acquisition unit 20A acquires the conditional expression of the KPI relative value as the resilience requirements.

The first acquisition unit 20A may acquire the conditional expression for the KPI absolute value, which is the KPI after the introduction of the resilience action, as the resilience requirements.

The target condition to be satisfied by the KPI may be expressed in words representing a target level. For example, the target condition to be satisfied by KPI may be words that represent the target levels of KPI, such as "high", "medium", and "low". In this case, the correspondence between the range of the values expressing KPI and the words expressing the levels such as "high", "medium", and "low" may be defined in advance and the words expressing the levels corresponding to the values expressing the KPI input in the UI unit 12 may be used as the resilience requirements. For example, if KPI≤0.1, the level is "high", if 0.1<KPI≤0.3, the level is "medium", and if 0.3<KPI, the level is "low". The conversion rules are thus determined in advance. Then, the first acquisition unit 20A may acquire the word representing the level corresponding to the value acquired from the UI unit 12 (for example, level "medium", etc.) as the resilience requirements.

In the example described in this embodiment, the first acquisition unit 20A acquires the conditional expression (see FIG. 3) expressing the resilience requirements, as the resilience requirements.

Referring back to FIG. 1, the explanation is continued.

The second acquisition unit 20B acquires system constraint information for the target system 40.

The system constraint information is information expressing the constraint requirement level required for each constraint item for the target system 40. For example, the system constraint information expresses the constraint requirement level that the user requires for the target system 40.

The constraint item is an item expressing a constraint other than the resilience for the target system 40. In the example described in this embodiment, the constraint item and the influence item coincide. As described above, in the example of this embodiment, the influence items are installation cost, running cost, and system load. For this reason, this embodiment describes one example in which the constraint items are installation cost, running cost, and system load.

The second acquisition unit 20B acquires from the UI unit 12, the system constraint information for the target system 40 that is input by the user's operation instruction of the UI unit 12, for example. The second acquisition unit 20B may acquire the system constraint information for the target system 40 from an external information processing device connected to the information processing device 10 via a network or the like. The second acquisition unit 20B may acquire the system constraint information for the target system 40, which is stored in the storage unit 14 in advance, by reading the system constraint information from the storage unit 14.

FIG. 4 is a schematic diagram of one example of the system constraint information.

The second acquisition unit 20B acquires information representing the constraint requirement level required for each of these constraint items, for example, "requirement: high", "requirement: medium", or "requirement: low". FIG. 4 expresses a scene in which the second acquisition unit 20B acquires the system constraint information representing "requirement: high" for the installation cost, "requirement: medium" for the running cost, and "requirement: high" for the system load.

Referring back to FIG. 1, the explanation is continued.

For each of the action sets including one action or the combination of the actions and being different from each other for the resilience, the calculation unit 20C calculates the resilience indicator of the target system 40 to which the action set is applied.

First, the calculation unit 20C generates a plurality of action sets for which at least one of the type and the number of actions included is different, by using the actions registered in the cyber resilience catalog 14A.

Specifically, the calculation unit 20C selects one or more actions from the actions registered in the cyber resilience catalog 14A to generate the action sets. The calculation unit 20C may generate the action sets of all combinations that satisfy the condition that at least one of the type and the number of actions included is different. The calculation unit 20C may generate a predetermined number of action sets among the action sets of all combinations that satisfy the condition.

Then, for each of the generated action sets, the calculation unit 20C calculates a resilience indicator for the target system 40 to which the action set is applied.

The resilience indicator is an evaluation value of the resilience when the action set is applied to the target system 40. The resilience indicator and the above resilience requirements are expressed by the same indicator. For this reason, in the example described in this embodiment, the resilience indicator is expressed by KPI. In detail, in the example described in this embodiment, the KPI relative value that represents the ratio of KPI after the introduction of the resilience action to KPI before the introduction of the resilience action is used as the resilience indicator. The KPI absolute value, which is KPI after the introduction of the resilience action, may be used as the resilience indicator.

The calculation unit 20C calculates a resilience indicator for each action set, based on the resilience parameter that represents an improvement degree of each of the resilience items in a case where the action represented by the action set is introduced in the target system 40.

A calculation method for the resilience indicator by the calculation unit 20C is described in detail.

Figure 5A:
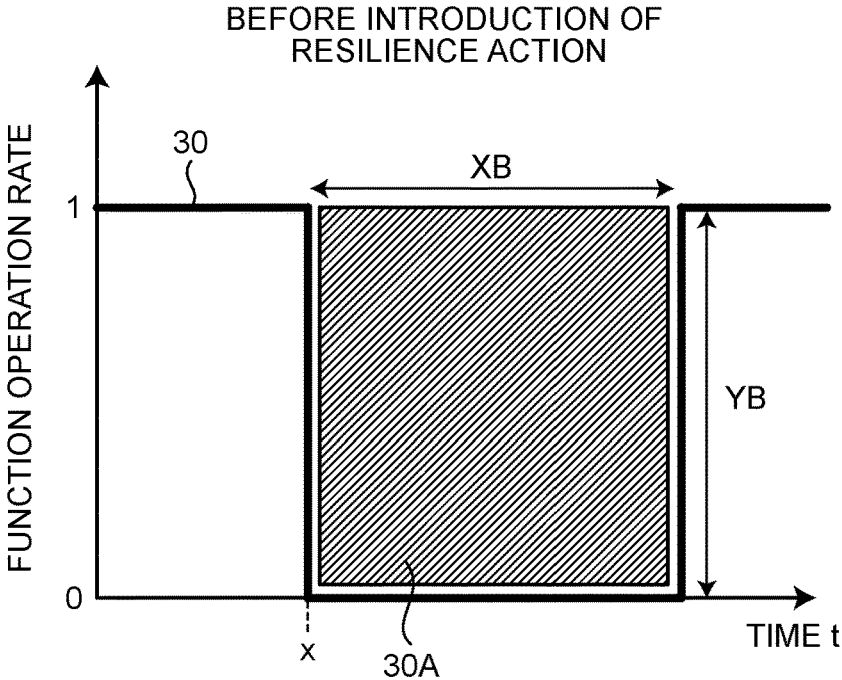
FIG. 5A is an explanatory diagram of calculating a resilience indicator.
Figure 5B:
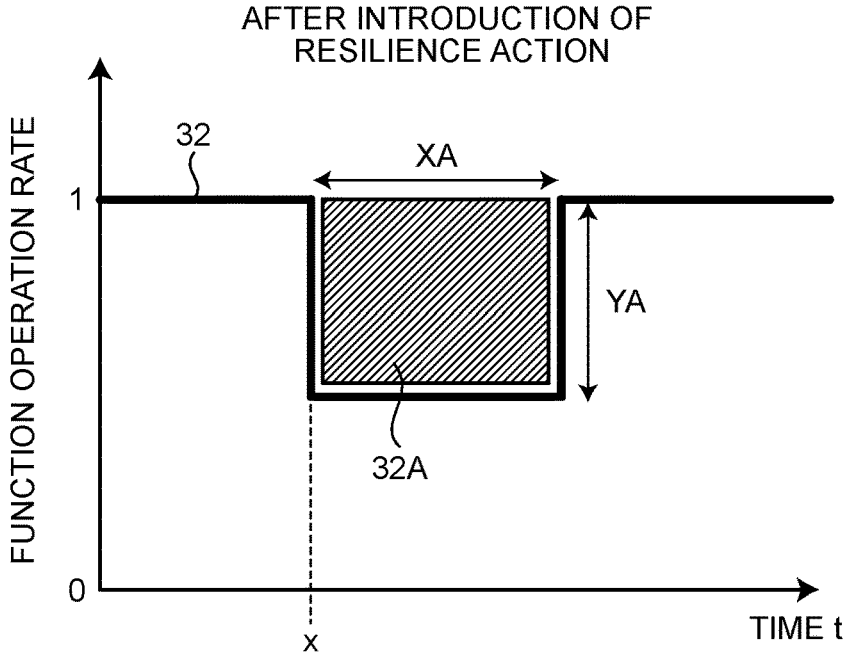
FIG. 5B is an explanatory diagram of calculating the resilience indicator.

FIG. 5A and FIG. 5B are explanatory diagrams of one example of calculating the resilience indicator for each action set by the calculation unit 20C. The calculation unit 20C calculates a resilience indicator for each action set by performing the following calculation for each of the created action sets.

In detail, the calculation unit 20C calculates the first KPI absolute value and the second KPI absolute value. The first KPI absolute value and the second KPI absolute value are examples of the KPI absolute value. The first KPI absolute value is the KPI absolute value before the introduction of the action included in the action set into the target system 40. The second KPI absolute value is the KPI absolute value after the introduction of the action included in the action set into the target system 40.

FIG. 5A is an explanatory diagram of one example of calculating the first KPI absolute value.

In FIG. 5A, the vertical axis represents the function operation rate and the horizontal axis represents time. The function operation rate is expressed as a value of 0 through 1, both inclusive. The function operation rate "1" represents the state in which all functions included in the target system 40 are in operation. The function operation rate "0" represents the state in which all functions included in the target system 40 are not in operation, i.e., all functions are stopped. Thus, if 30% of the functions in the target system 40 is in operation, the function operation rate represents "0.3".

In FIG. 5A, a line diagram 30 represents the transition of the function operation rate of the target system 40 before the introduction of the action included in the action set in a case where an incident occurs at time x.

In FIG. 5A, XB represents the return time. In detail, XB represents the time (period) required for the function operation rate to return to "1.0" in a case where an incident occurs at time x. YB represents the function stop rate determined from the function operation rate and is expressed by the following expression (1).

$$YB = 1 - \text{function operation rate} \qquad \text{Expression (1)}$$

A region with the area represented by XB×YB is referred to as a resilience area 30A. The resilience area 30A represents the integrated value of the function operation rate when it takes the time XB after an incident occurs and before the function operation rate returns to "1.0". It can be said that as this resilience area 30A is smaller, the influence of the incident on the target system 40 is smaller.

Then, the calculation unit 20C calculates the first KPI absolute value of the action included in the action set using the following expression (2).

$$\text{First } KPI \text{ absolute value } KPI\_abs = XB \times YB \times ZB \qquad \text{Expression (2)}$$

ZB represents the attack occurrence rate against the target system 40 before the introduction of the action included in the action set.

For example, it is assumed that XB is "10" and the function operation rate is "0.3". In this case, the calculation unit 20C calculates, as the resilience area 30A, "0.7" calculated by XB×YB=10×(1−0.3). Additionally, it is assumed that ZA is "1". In this case, the calculation unit 20C calculates "0.7" calculated by XB×YB×ZB=10×(1−0.3)×1 as the first KPI absolute value.

FIG. 5B is an explanatory diagram of one example of calculating the second KPI absolute value.

In FIG. 5B, the vertical axis represents function operation rate and the horizontal axis represents time. In FIG. 5B, a line diagram 32 represents the transition of the function operation rate of the target system 40 after the introduction of the action included in the action set in a case where an incident occurs at time x.

In FIG. 5B, XA represents the return time. In detail, XA represents the time (period) required for the function operation rate to return to "1.0" after an incident occurs at time x. YA represents the function stop rate determined from the function operation rate. ZA represents the attack occurrence rate against the target system 40 after the introduction of the action included in the action set. In detail, XA, YA, and ZA are represented by the following expressions (3A) through (3C).

$$XA = XB \times (1 - \text{improvement rate of total return time}) \qquad \text{Expression (3A)}$$

$$YA = YB \times \qquad \text{Expression (3B)}$$
$$(1 - \text{improvement rate of total function operation rate})$$

$$ZA = ZB \times (1 - \text{reduction rate of total attack success rate}) \qquad \text{Expression (3C)}$$

The improvement rate of the total return time represents the improvement rate of the return time after the action in the action set is introduced in the target system 40.

The calculation unit 20C reads the value of the resilience parameter corresponding to the resilience item "improvement rate of return time" shown in the cyber resilience catalog 14A for each of one or all actions included in the action set. The calculation unit 20C then specifies the value of the resilience parameter that represents the highest improvement rate among the values of the resilience parameters of the resilience item "improvement rate of return time" read for each of one or all actions included in the action set. That is, the calculation unit 20C specifies the value of the resilience parameter with the largest value among the values of the resilience parameters of the resilience item "improvement rate of return time" read for each of one or all actions included in the action set.

Then, the calculation unit 20C specifies the specified value of the resilience parameter as the value of the resilience item "improvement rate of return time" in the action set. Then, the calculation unit 20C may calculate the return time XA using the above expression (3A).

For example, it is assumed that the only action included in the action set as a process target is "firewall". The resilience item "improvement rate of return time" corresponding to "firewall" shown in the cyber resilience catalog 14A (see FIG. 2) is "0%". Additionally, it is assumed that XB=1. In this case, the calculation unit 20C calculates "1", which is the calculation result of XA=1×1, as the return time XA according to the above expression (3A).

In another example, it is assumed that the actions included in the action set as the process target are "firewall" and "fallback". The resilience items "improvement rate of return time" corresponding to "firewall" and "fallback" shown in the cyber resilience catalog 14A (see FIG. 2) are both "0%". Additionally, it is assumed that XB=1. In this case, the calculation unit 20C calculates "1", which is the calculation result of XA=1×1, as the return time XA according to the above expression (3A).

The improvement rate of the total function operation rate represents the improvement rate of the function operation rate after the action in the action set is introduced in the target system 40.

The calculation unit 20C reads the value of the resilience parameter of the resilience item "improvement rate of function operation rate" shown in the cyber resilience catalog 14A for each of one or all actions included in the action set. Then, the calculation unit 20C specifies the value of the resilience parameter that represents the highest improvement rate among the values of the resilience parameters of the resilience item "improvement rate of function operation rate" read for each of one or all actions included in the action set. That is, the calculation unit 20C specifies the value of the resilience parameter with the largest value among the values of the resilience parameters of the resilience item "improvement rate of function operation rate" read for each of one or all actions included in the action set.

Then, the calculation unit 20C specifies the specified value of the resilience parameter as the value of the resilience item "improvement rate of function operation rate" in the action set. Then, the calculation unit 20C may calculate the function stop rate YA using the above expression (3B).

For example, it is assumed that the only action included in the action set as the process target is "firewall". The resilience item "improvement rate of function operation rate" corresponding to "firewall" shown in the cyber resilience catalog 14A (see FIG. 2) is "0%". Additionally, it is assumed that YB=1. In this case, the calculation unit 20C calculates "1", which is the calculation result of YA=1×1, as the function stop rate YA according to the above expression (3B).

In another example, it is assumed that the actions included in the action set as the process target are "firewall" and "fallback". The resilience items "improvement rate of function operation rate" corresponding to "firewall" and "fallback" shown in the cyber resilience catalog 14A (see FIG. 2) are "0%" and "50%", respectively. In this case, the calculation unit 20C specifies the higher improvement rate, i.e., the larger value "50%", as the "improvement rate of total function operation rate" for the action set. Additionally, it is assumed that XB=1. In this case, the calculation unit 20C calculates "0.5", which is the calculation result of XA=1×(1−0.5), as the function stop rate YA according to the above expression (3A).

The reduction rate of the total attack success rate represents the improvement rate of the attack success rate after the action included in the action set is introduced in the target system 40.

The calculation unit 20C reads the value of the resilience parameter of the resilience item "reduction rate of attack success rate" shown in the cyber resilience catalog 14A for each of one or all actions included in the action set. The calculation unit 20C specifies the value of the resilience parameter that represents the highest reduction rate among the values of the resilience parameters of the resilience item "reduction rate of attack success rate" read for each of one or all actions included in the action set. That is, the calculation unit 20C specifies the value of the resilience parameter with the largest value among the values of the resilience parameters of the resilience item "reduction rate of attack success rate" read for each of one or all actions included in the action set.

Then, the calculation unit 20C specifies the specified value of the resilience parameter as the value of the resilience item "reduction rate of attack success rate" in the action set. Then, the calculation unit 20C can calculate the attack occurrence rate ZA using the above expression (3C).

For example, it is assumed that the only action included in the action set as the process target is "firewall". The resilience item "reduction rate of attack success rate" corresponding to "firewall" shown in the cyber resilience catalog 14A (see FIG. 2) is "50%". Additionally, it is assumed that ZB=1. In this case, the calculation unit 20C calculates "0.5", which is the calculation result of ZA=1× (1−0.5), as the attack occurrence rate ZA according to the above expression (3C).

In another example, it is assumed that the actions included in the action set as the process target are "firewall" and "anti-virus". The resilience items "reduction rate of attack success rate" corresponding to "firewall" and "anti-virus" shown in the cyber resilience catalog 14A (see FIG. 2) are "50%" and "30%", respectively. In this case, the calculation unit 20C specifies the higher reduction rate, i.e., the larger value "50%", as the "reduction rate of the total attack success rate" for that action set. Additionally, it is assumed that ZB=1. In this case, the calculation unit 20C calculates "0.5", which is the calculation result of ZA=1×(1−0.5), as the attack occurrence rate ZA according to the above expression (3C).

As described above, in this embodiment, description is made of the example in which when the action set includes more than one action, the calculation unit 20C specifies the value of the resilience parameter expressing the highest improvement rate or the highest reduction rate among the values of the resilience parameters read for each of the actions. In other words, description is made of the case in which when the action set includes more than one action, the calculation unit 20C specifies the largest value of the resilience parameter among the values of the resilience parameters read for each of the actions.

However, when the action set includes more than one action, the calculation unit 20C may specify the value of the parameter obtained by adjusting such that the largest value among the values of the resilience parameters read for each of the actions becomes larger in accordance with the type of the resilience item.

Specifically, for example, it is assumed that the action set as the process target includes the actions "firewall" and "anti-virus". In addition, it is assumed that the attack success rate ZA in the resilience item "reduction rate of attack success rate" is calculated.

In this case, the resilience items "reduction rate of attack success rate" corresponding to "firewall" and "anti-virus" shown in the cyber resilience catalog 14A (see FIG. 2) are "50%" and "30%", respectively. Here, as more actions are introduced, the reduction rate of the attack success rate may be improved more compared to the case where one action is introduced. In view of this, the calculation unit 20C may specify, as "reduction rate of total attack success rate" in the action set, the multiplying result obtained by multiplying the larger value "50%" by a correction value of the value larger than 1 according to the combination of the actions. This correction value may be set in advance for each of the included resilience items for each of the action sets for which the combination of the included actions is different.

Then, the calculation unit 20C calculates the second KPI absolute value by the following expression (4).

$$\text{Second } KPI \text{ absolute value } KPI\_abs = XA \times YA \times ZA \qquad \text{Expression (4)}$$

A region with the area represented by XA×YA is referred to as a resilience area 32A. The resilience area 32A represents the integrated value of the function operation rate when it takes the time XA after an incident occurs and before the function operation rate returns to "1.0". It can be said that as this resilience area 32A is smaller, the influence of the incident on the target system 40 is smaller.

Then, the calculation unit 20C calculates the KPI relative value, which represents the ratio of the second KPI absolute value to the first KPI absolute value (second KPI absolute value/first KPI absolute value), as the resilience indicator. That is to say, the calculation unit 20C calculates, as the resilience indicator, the values obtained using: integrated values (resilience area 30A, resilience area 32A) resulting from integrating, within the return times (XB, XA), the function stop rates (YB, YA) obtained from the function operation rate; and the attack success rates (ZB, ZA).

In detail, the calculation unit 20C calculates the KPI relative value representing the resilience indicator using the following expression (5).

$$KPI \text{ relative value } KPI\_rel = \qquad \text{Expression (5)}$$

$$(XA \times YA \times ZA)/(XB \times YB \times ZB)$$

FIG. 6 is an explanatory diagram of one example of the calculation results by the calculation unit 20C.

The calculation unit 20C calculates the resilience indicator using the resilience parameter shown in the cyber resilience catalog 14A for each of the action sets, thereby being able to calculate the resilience indicator in FIG. 6 for each action set.

FIG. 6 expresses the case in which the KPI relative value KPI_rel for each action set that the calculation unit 20C has calculated based on XB=YB=ZB=1 in accordance with the calculation method described above, is obtained as the resilience indicator. In the column of the resilience parameter in FIG. 6, the largest value in the cyber resilience catalog 14A in FIG. 2 among the resilience parameters corresponding to the actions in the corresponding action set is expressed for each resilience item as the value used in the calculation.

In the example in FIG. 6, the value of the KPI relative value (KPI_rel), which is the resilience indicator of the action set including only "duplication", is the smallest, and the value of the KPI relative value (KPI_rel), which is the resilience indicator of the action set including "firewall" and "fallback", is the next smallest value. As described above, in this embodiment, a smaller value of KPI means a higher evaluation value. Therefore, the example in FIG. 6 indicates the evaluation value of the resilience indicator of the action set including only "duplication" is the highest and the evaluation value of the resilience indicator of the action set including "firewall" and "fallback" is the second highest.

FIG. 5B shows an example where the resilience area 32A is calculated as the area of a rectangular region represented by XA×YA. However, the resilience area 32A is not limited to the area of the rectangular region.

Figures 7, 8:
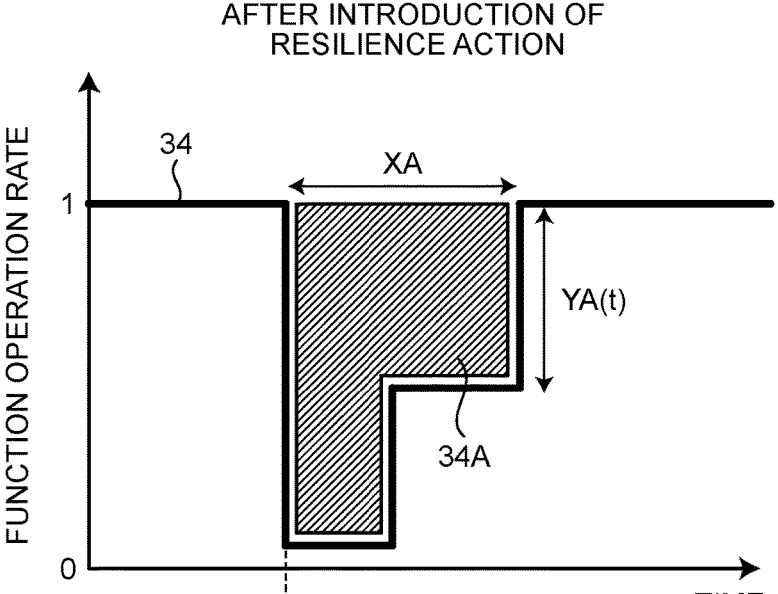
FIG. 7 is an explanatory diagram of calculating a second KPI absolute value.
FIG. 8 is a schematic diagram of a data configuration of a score conversion table.

FIG. 7 is an explanatory diagram of one example of calculating the second KPI absolute value. As illustrated in FIG. 7, there may be a gradual recovery or loss of the function operation rate.

In FIG. 7, the vertical axis represents the function operation rate and the horizontal axis represents time. In FIG. 7, a line diagram 34 along a resilience area 34A represents the transition of the function operation rate of the target system 40 after the introduction of the action included in the action set in a case where an incident occurs at time x.

In FIG. 7, XA represents the return time. In detail, XA represents the time (period) required for the function operation rate to return to "1.0" after an incident occurs at time x. YA(t) represents the function operation rate. ZA represents the attack occurrence rate against the target system 40 after the introduction of the action included in the action set. In this case, YA(t) is expressed by the following expression (6), and the second KPI absolute value after the introduction of the action included in the action set into the target system 40 is expressed by the following expression (7). The KPI relative value representing the resilience indicator is expressed by the following expression (8).

$$\int YA(t) \qquad \text{Expression (6)}$$

$$KPI\_abs = \int YA(t) \times ZA \qquad \text{Expression (7)}$$

$$KPI\_rel = \int YA(t) \times ZA \times ZA/(XB \times YB \times ZB) \qquad \text{Expression (8)}$$

In expressions (6) through (8), t represents time. Additionally, t is a value of x through x+XA, both inclusive. Moreover, x represents the incident occurrence time.

The calculation method for the resilience indicator by the calculation unit 20C is not limited to the above methods. For example, a quality-of-service (Qos) index may be used as the vertical axis in FIG. 5A, FIG. 5B, and FIG. 7, instead of the function operation rate. Instead of the resilience area calculated from the function operation rate and time, the calculation unit 20C may use the amount of damage at the incident occurrence time and the like.

In this embodiment, the calculation unit 20C further calculates a constraint sufficiency score.

The constraint sufficiency score is a score that represents the sufficiency degree of the action set about the constraint represented by the system constraint information acquired by the second acquisition unit 20B.

First, for each action set, the calculation unit 20C calculates the score representing the sufficiency degree of the constraint requirements for each constraint item in accordance with the influence parameter and a constraint requirement level for each constraint item represented by the system constraint information acquired by the second acquisition unit 20B.

First, the calculation unit 20C calculates the score using the score conversion table 14B.

FIG. 8 is a schematic diagram of one example of a data configuration of the score conversion table 14B.

The score conversion table 14B is information that represents the score corresponding to the influence degree represented by the influence parameter and the constraint requirement level. In the score conversion table 14B, the scores representing the values that are larger when the influence degree is larger and that are larger when the constraint requirement level is higher are registered in advance.

For each constraint item represented by the system constraint information acquired by the second acquisition unit 20B, the calculation unit 20C specifies from the score conversion table 14B the scores corresponding to the constraint requirement level of the constraint item and each influence degree of the influence item represented by the influence parameter shown in the cyber resilience catalog 14A. The calculation unit 20C specifies the specified score as the score representing the sufficiency degree of the constraint requirements for each constraint item.

For example, it is assumed that the only action included in the action set is "firewall". Additionally, it is assumed that the second acquisition unit 20B acquires the system constraint information expressed in FIG. 4.

In this case, the calculation unit 20C specifies, from the score conversion table 14B, the cost "0" corresponding to the constraint requirement level "requirement: high" for the constraint item "initial cost" included in the system constraint information acquired by the second acquisition unit 20B, and the influence degree "low" in the same influence item "initial cost" as the constraint item corresponding to the action "firewall" in the cyber resilience catalog 14A. The calculation unit 20C then calculates this specified cost "0" as the score of the constraint item "initial cost" corresponding to the action set.

Note that in a case where the action set includes more than one action, the calculation unit 20C may calculate the score using the largest influence degree among the influence degrees of the influence items to be calculated corresponding to the respective actions in the cyber resilience catalog 14A.

For example, it is assumed that the action set includes "firewall" and "fallback". Additionally, it is assumed that the second acquisition unit 20B acquires the system constraint information expressed in FIG. 4.

In this case, the calculation unit 20C specifies the influence degree "medium" among the influence degree "low" of the influence item "initial cost" corresponding to the action "firewall" and the influence degree "medium" of the influence item "initial cost" corresponding to the action "fallback" in the cyber resilience catalog 14A. In this case, the calculation unit 20C specifies, from the score conversion table 14B, the cost "0.6" corresponding to the influence degree "medium" and the constraint requirement level "requirement: high" for the same constraint item "initial cost" as the influence item included in the system constraint information acquired by the second acquisition unit 20B. The calculation unit 20C then calculates this specified cost "0.6" as the score of the constraint item "initial cost" corresponding to the action set.

The calculation unit 20C calculates the scores representing the sufficiency degree of the constraint requirements for each constraint item in the similar way for other constraint items "running cost" and "system load".

Then, using the score calculated for each constraint item, the calculation unit 20C calculates the constraint sufficiency score representing the sufficiency degree of the constraint represented by the system constraint information for each action set.

For example, the calculation unit 20C calculates the sum of the scores calculated for each of the constraint items for each of the action sets as the constraint sufficiency score for the corresponding action set.

Specifically, it is assumed that the score of the constraint item "initial cost" for a certain action set is "0.6", the score of the constraint item "running cost" is "0.3", and the score of the constraint item "system load" is "0". In this case, the calculation unit 20C calculates the sum of these scores, "0.9", as the constraint sufficiency score for the action set.

FIG. 6 further expresses the scores and the constraint sufficiency scores calculated by the calculation unit 20C. FIG. 6 also expresses the scores of the respective influence items used to calculate the constraint sufficiency scores.

As expressed in FIG. 6, the calculation unit 20C performs the above calculations to calculate the score for each influence item (i.e., constraint item) for each of the action sets, and calculate the constraint sufficiency score represented by the sum of these scores. In this embodiment, a smaller value of the constraint sufficiency score means the higher constraint sufficiency.

Referring back to FIG. 1, the explanation is continued.

Based on the resilience indicator (KPI relative value) calculated for each of the action sets, the selection unit 20D selects the action set satisfying the resilience requirements acquired by the first acquisition unit 20A among the action sets as the optimum resilience design information for the target system 40.

Description is made with reference to FIG. 6. For example, it is assumed that the calculation unit 20C calculates the resilience indicator (KPI relative value) and the constraint sufficiency score in FIG. 6 for each action set for a certain target system 40.

The selection unit 20D specifies, among the generated action sets, the action set for which the KPI relative value corresponding to the resilience indicator satisfies the resilience requirements acquired by the first acquisition unit 20A.

For example, it is assumed that in the resilience requirements acquired by the first acquisition unit 20A, the KPI relative value is less than 0.3, as expressed in FIG. 3. In this case, the selection unit 20D specifies among the action sets in FIG. 6, the action set including only "duplication" with a KPI relative value, corresponding to the resilience indicator, of less than 0.3 and the action set including "firewall" and "fallback" as the action sets that satisfy the resilience requirements.

The selection unit 20D then selects the specified action set satisfying the resilience requirements as the optimum resilience design information for the target system 40.

The selection unit 20D may further select the action set for which the resilience indicator satisfies the resilience requirements acquired by the first acquisition unit 20A and the constraint sufficiency score satisfies a predetermined condition, as the resilience design information.

The predetermined condition may be determined in advance. For example, the predetermined condition is N number of action sets in the order of the high-to-low constraint sufficiency degree represented by the constraint sufficiency score. N is an integer of 1 or more. N may be changed as needed according to the user's operation instruction of the UI unit 12.

As described above, in this embodiment, a smaller value of the constraint sufficiency score means that the constraint is satisfied more. Therefore, in this embodiment, the selection unit 20D selects N number of action sets in the order of low-to-high constraint satisfaction scores, for example.

Specifically, for example, it is assumed that the selection unit 20D specifies the action set including only the action "duplication" for which the KPI relative value is less than 0.3 and the action set including the action "firewall" and the action "fallback" among the action sets in FIG. 6. The constraint sufficiency score of the action set including only the action "duplication" is "1.3", and the constraint sufficiency score of the action set including the action "firewall" and the action "fallback" is "0.9".

In this case, the selection unit 20D selects N number of action sets in the order of low-to-high constraint sufficiency scores. When N is "1", the selection unit 20D selects the action set including the action "firewall" and the action "fallback" as the optimum resilience design information for the target system 40. When N is "2", the selection unit 20D selects the action set including the action "firewall" and the action "fallback" and the action set including only the action "duplication" as the optimum resilience design information for the target system 40. In this case, the selection unit 20D may assign an overall rank to the selected action set. The overall rank is given in the order of the high-to-low constraint sufficiency degree represented by the constraint sufficiency score.

Referring back to FIG. 1, the explanation is continued.

The output control unit 20E outputs the resilience information selected by the selection unit 20D. The output control unit 20E may output the resilience information selected by the selection unit 20D, and at least one of the resilience requirements acquired by the first acquisition unit 20A and the system constraint condition acquired by the second acquisition unit 20B. The output control unit 20E may further sort and output the resilience information selected by the selection unit 20D in the order of high-to-low constraint sufficiency degree represented by the constraint sufficiency score. The output control unit 20E may also output the resilience design information selected by the selection unit 20D with the above overall rank assigned to the resilience setting information.

For example, the output control unit 20E outputs the resilience information selected by the selection unit 20D to the UI unit 12. The output control unit 20E may also output the selected resilience information, and at least one of the resilience requirements, the system constraint condition, and the overall rank to the UI unit 12, as described above. By viewing the UI unit 12, a user can check the resilience design information, which is the optimum action set for the target system 40.

For example, the output control unit 20E may output the resilience information selected by the selection unit 20D to an external information processing device via a network or the like. The output control unit 20E may also store the resilience information selected by the selection unit 20D in the storage unit 14. In this case, the output control unit 20E may output the selected resilience information and at least one of the resilience requirements, the system constraint condition, and the overall rank to an external information processing device or store these in the storage unit 14.

Next, one example of the procedure of the information processing to be executed by the information processing device 10 in this embodiment will be described.

Figure 9:
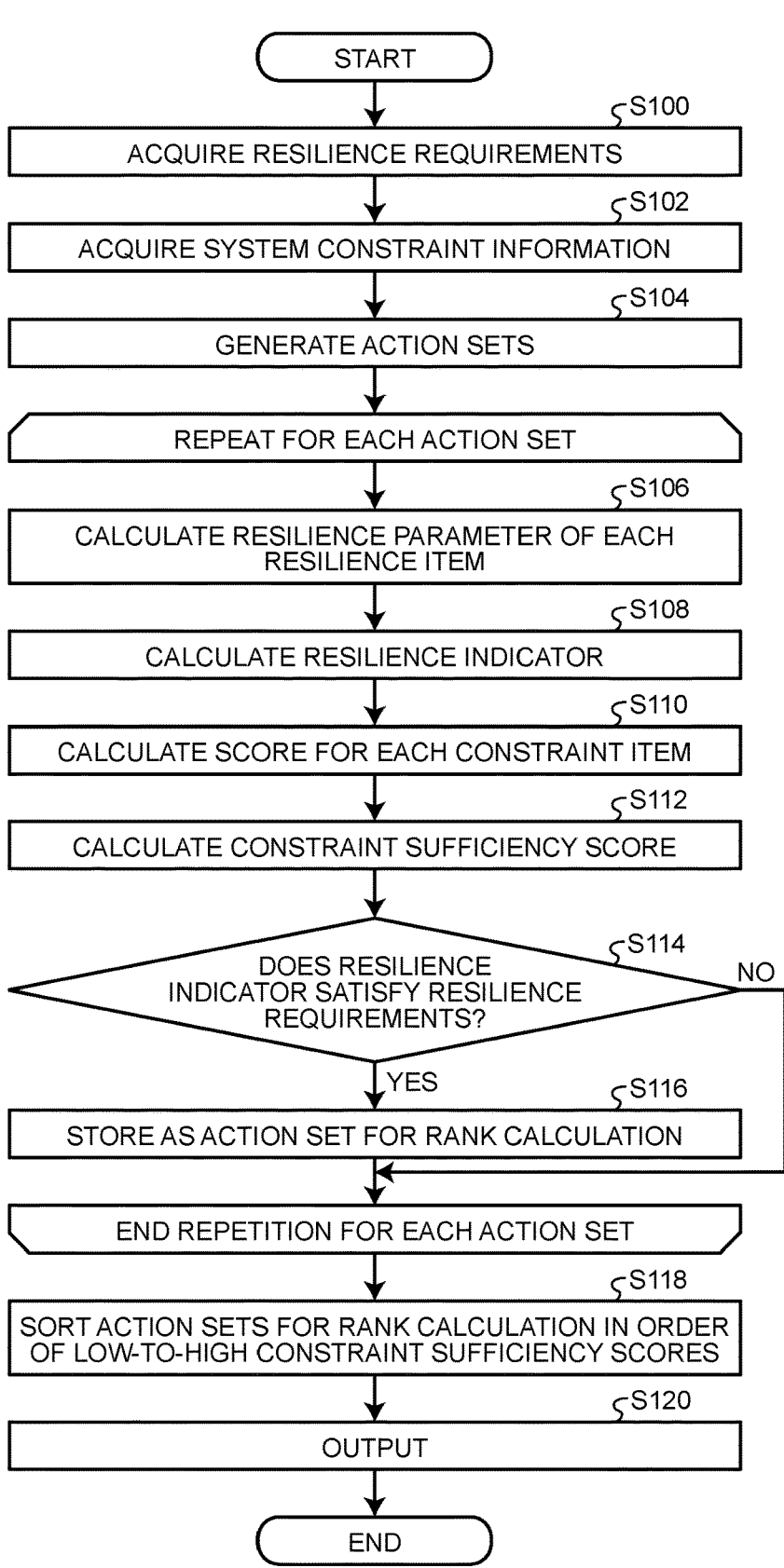
FIG. 9 is a flowchart expressing the procedure of information processing.

FIG. 9 is a flowchart expressing one example of the procedure of the information processing to be executed by the information processing device 10 in this embodiment.

The first acquisition unit 20A acquires the resilience requirements for the target system 40 (step S100). For example, the user inputs the desired resilience requirements by operating the UI unit 12. The first acquisition unit 20A acquires the resilience requirements input by the user from the UI unit 12.

The second acquisition unit 20B acquires system constraint information for the target system 40 (step S102). For example, the user inputs the desired system constraint information by operating the UI unit 12. The second acquisition unit 20B acquires the system constraint information input by the user from the UI unit 12.

The calculation unit 20C, by using the actions registered in the cyber resilience catalog 14A, generates the action sets for which at least one of the number and the type of actions included is different (step S104).

The calculation unit 20C and the selection unit 20D then repeat steps S106 through S116 for each of the action sets generated at step S104.

In detail, the calculation unit 20C calculates the resilience parameter that represents the improvement degree of each of the resilience items in a case where the action included in the action set as the process target is introduced in the target system 40 (step S106). The calculation unit 20C reads the value of the resilience parameter for each of the resilience items shown in the cyber resilience catalog 14A for each of one or all actions included in the action set. Then, the calculation unit 20C calculates the value of the resilience parameter that represents the highest improvement rate in each resilience item among the values of the resilience parameters read for each resilience item, as the resilience parameter for each resilience item.

Then, the calculation unit 20C calculates the resilience indicator using the value of the resilience parameter for each of the resilience items calculated at step S106 (step S108). As described above, for example, the calculation unit 20C calculates the KPI relative value as the resilience indicator.

Next, for the action set as the process target, the calculation unit 20C calculates the score representing the sufficiency degree of the constraint requirements for each constraint item in accordance with the influence parameter and the constraint requirement level for each constrain item represented by the system constraint information acquired at step S102 (step S110).

Then, using the score calculated for each constraint item at step S110, the calculation unit 20C calculates the constraint sufficiency score that represents the sufficiency degree of the constraint represented by the system constraint information for the action set as the process target (step S112).

Next, the selection unit 20D determines whether the resilience indicator calculated at step S108 satisfies the resilience requirements acquired at step S100 (step S114). If it is determined that the resilience requirements are not satisfied (No at step S114), the process for this action set is terminated. If it is determined that the resilience requirements are satisfied (Yes at step S114), the process advances to step S116.

At step S116, the selection unit 20D stores the action set as the process target determined to be Yes at step S114 in the storage unit 14 as the action set for rank calculation (step S116).

Since the calculation unit 20C and the selection unit 20D perform the process at step S106 to step S116 for each of the action sets generated at step S104, the action set for the resilience indicator satisfying the resilience requirements is stored in the storage unit 14 as the action set for the rank calculation. At this time, the selection unit 20D may associate the action set with at least one of the resilience requirements used for calculating the action set, the system constrain information, the resilience indicator, the constrain sufficiency score, and the overall rank assigned in the order of high-to-low constraint sufficiency degree represented by the constraint sufficiency score and store these in the storage unit 14.

When the calculation unit 20C and the selection unit 20D perform the process at step S106 to step S116 for each of the action sets generated at step S104, the action set satisfying the resilience requirements acquired at step S100 is selected as the optimum resilience design information for the target system 40.

The output control unit 20E sorts the action sets for rank calculation stored at step S116 in the order of low-to-high constraint sufficiency scores (step S118).

The output control unit 20E then outputs the action sets sorted at step S118 as the optimum resilience design information for the target system 40 (step S120). This routine is then terminated.

As described above, the information processing device 10 in this embodiment includes the first acquisition unit 20A, the calculation unit 20C, and the selection unit 20D. The first acquisition unit 20A acquires resilience requirements for the target system 40. For each of the action sets including one action or the combination of the actions and being different from each other for the resilience, the calculation unit 20C calculates the resilience indicator of the target system 40 to which the action set is applied. Based on the resilience indicator calculated for each of the action sets, the selection unit 20D selects the action set satisfying the resilience requirements among the action sets, as the resilience design information.

In this manner, the information processing device 10 according to this embodiment selects the action set for which the resilience indicator of each of the action sets satisfies the resilience requirements among the action sets including one action or the combination of the actions and being different from each other for the resilience, as the optimum resilience design information for the target system 40.

Therefore, by acquiring the resilience requirements required for the target system 40, the information processing device 10 can select the optimum resilience design information satisfying the resilience requirements.

Therefore, the information processing device 10 according to this embodiment can provide the optimum resilience design information for the target system 40.

Based on the constraints of the target system 40, the information processing device 10 according to this embodiment can also provide the resilience design information suitable for the target system 40.

By acquiring the resilience requirements required for the target system 40, the information processing device 10 according to this embodiment selects the optimum resilience design information satisfying the resilience requirements.

Thus, by inputting the desired resilience requirements required for the target system 40, the user can receive the optimum resilience design information satisfying those resilience requirements. In other words, even users who are not familiar with system design or do not have expertise in resilience can receive the optimum resilience design information satisfying the resilience requirements by inputting the desired resilience requirements. The information processing device 10 according to this embodiment can also provide the information that can facilitate the design of resilient systems to designers and others who are not familiar with system design or who do not have expertise in resilience.

Second Embodiment

This embodiment describes a mode in which nodes in the target system 40 are classified into a plurality of groups, and the resilience design information is selected for each group using the resilience indicator calculated for each of the classified groups.

Figure 10:
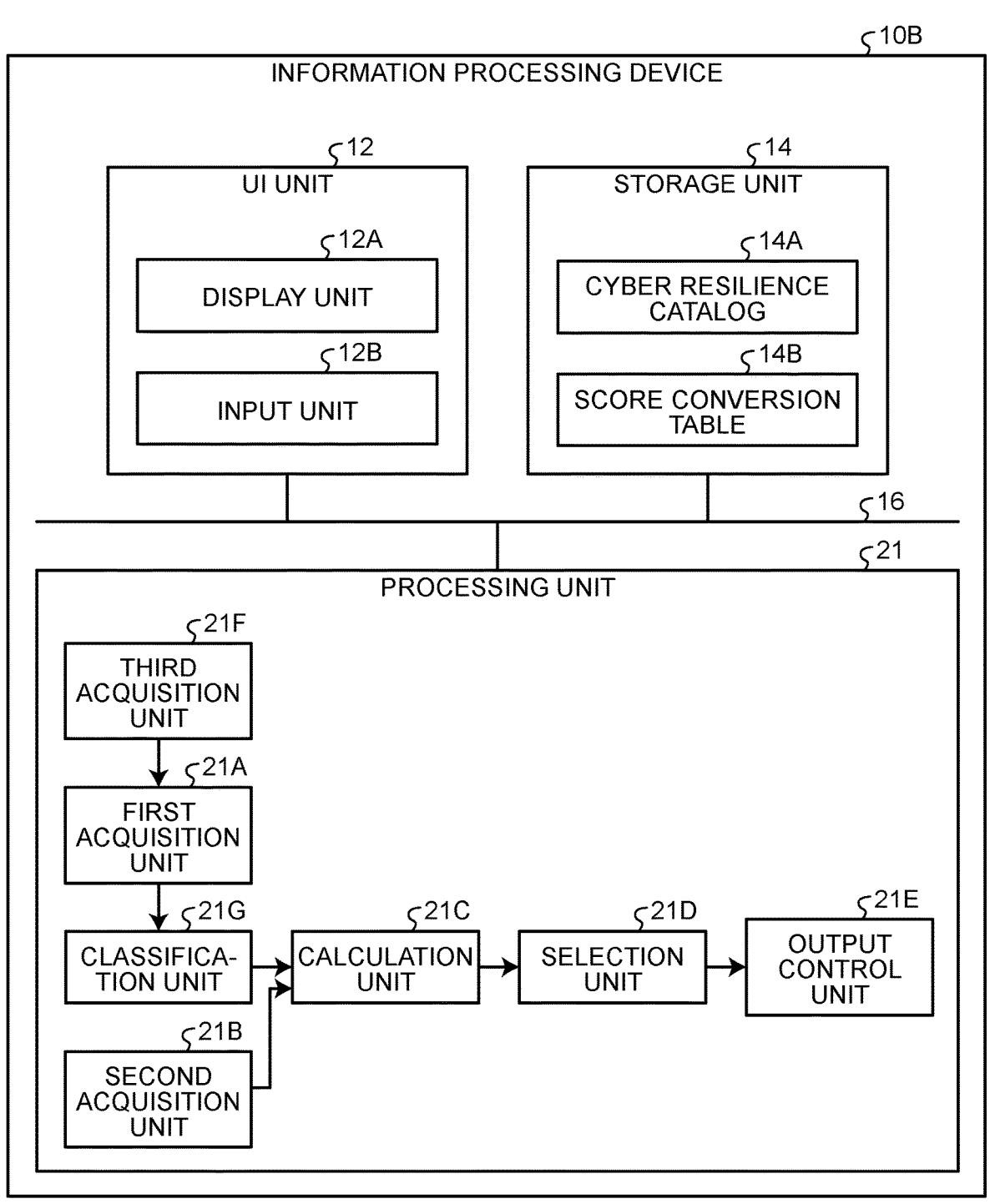
FIG. 10 is a schematic diagram of an information processing device.

FIG. 10 is a schematic diagram illustrating one example of an information processing device 10B according to this embodiment.

The information processing device 10B includes the UI unit 12, the storage unit 14, and a processing unit 21. The information processing device 10B is similar to the information processing device 10 according to the above embodiment, except that the information processing device 10B includes the processing unit 21 instead of the processing unit 20.

The processing unit 21 includes a first acquisition unit 21A, a second acquisition unit 21B, a calculation unit 21C, a selection unit 21D, an output control unit 21E, a third acquisition unit 21F, and a classification unit 21G. The processing unit 21 includes the first acquisition unit 21A, the second acquisition unit 21B, the calculation unit 21C, the selection unit 21D, and the output control unit 21E instead of the first acquisition unit 20A, the second acquisition unit 20B, the calculation unit 20C, the selection unit 20D, and the output control unit 20E in the processing unit 20. The processing unit 21 further includes the third acquisition unit 21F and the classification unit 21G. The processing unit 21 is similar to the processing unit 20 except for these points.

The third acquisition unit 21F acquires system configuration information.

The system configuration information is information concerning the nodes included in the target system 40 and the flow of data among the nodes. For example, the system configuration information includes information representing the functional configuration of each of the nodes in the target system 40, the number of nodes included, the flow of data between the nodes, etc.

The third acquisition unit 21F acquires from the UI unit 12, the system configuration information that is input by the user's operation instructions of the UI unit 12. The third acquisition unit 21F may also acquire the system configuration information of the target system 40 from an external information processing device connected to the information processing device 10B through a network or the like. The third acquisition unit 21F may alternatively acquire the system configuration information by reading the system configuration information stored in the storage unit 14 in advance from the storage unit 14.

The first acquisition unit 21A acquires the resilience requirements for the target system 40 similarly to the first acquisition unit 20A in the above embodiment. However, the first acquisition unit 21A acquires the resilience requirements for each of the nodes in the target system 40.

FIG. 11 is an explanatory diagram illustrating one example of the resilience requirements for each node acquired by the first acquisition unit 21A. Similarly to the above embodiment, FIG. 11 illustrates the mode in which the resilience requirements are represented by the KPI relative values. FIG. 11 also illustrates the mode in which the first acquisition unit 21A acquires the conditional expression of the KPI relative value for each node as the resilience requirements.

Referring back to FIG. 10, the explanation is continued.

Based on the resilience requirements for each of the nodes included in the target system 40 acquired by the first acquisition unit 21A, the classification unit 21G classifies the nodes included in the target system 40 into a plurality of groups with the similar resilience requirements.

For example, the classification unit 21G forms a group of those whose KPI target values represented by the conditional expression of the KPI relative value corresponding to the resilience requirements acquired by the first acquisition unit 21A are close. For example, it is assumed that the resilience requirements in FIG. 11 are acquired by the first acquisition unit 21A. In this case, the KPI target values of the combination of a node 1 and a node 3, and the combination of a node 2 and a node 4 are close. Thus, for example, the classification unit 21G classifies the node 1 to the node 4, which constitute the target system 40, into two groups: a group including the node 1 and the node 3, and a group including the node 2 and the node 4.

The classification unit 21G may alternatively classify the nodes included in the target system 40 into the groups such that data transfer between the nodes that belong to the same group decreases, in consideration of the data flow represented by the system configuration information. This process allows the classification unit 21G to classify the nodes included in the target system 40 into the groups so as to minimize the attack surface.

Referring back to FIG. 10, the explanation is continued.

The second acquisition unit 21B acquires the system constraint information for the target system 40 similarly to the second acquisition unit 20B. However, the second acquisition unit 21B acquires the system constraint information for each group classified by the classification unit 21G.

The second acquisition unit 21B acquires from the UI unit 12, for example, the system constraint information for each of the groups of the target system 40, which is input by the user's operation instructions of the UI unit 12. The second acquisition unit 21B may acquire the system constraint information for each of the groups of the target system 40 from an external information processing device connected to the information processing device 10 through a network or the like. The second acquisition unit 21B may acquire the system constraint information for each of the groups in the target system 40, which is stored in the storage unit 14 in advance, by reading the system constraint information from the storage unit 14.

FIG. 12 is a schematic diagram illustrating one example of the system constraint information to be acquired by the second acquisition unit 21B.

As illustrated in FIG. 12, the second acquisition unit 21B acquires, as the system constraint information, the information representing the constraint requirement level required for each constraint item for each of the groups to which the nodes included in the target system 40 are classified.

Referring back to FIG. 10, the explanation is continued.

Similarly to the calculation unit 20C in the above embodiment, the calculation unit 21C calculates the resilience indicator of the target system 40 to which the action set is applied, for each of the action sets. However, in this embodiment, the calculation unit 21C calculates the resilience indicator for each of the action sets for each of the groups classified by the classification unit 21G.

The calculation unit 21C may calculate the resilience indicator similarly to the calculation unit 20C in the above embodiment except that the resilience indicator is calculated for each of the groups to which the nodes included in the target system 40 are classified, instead of the whole target system 40.

In a manner similar to the selection unit 20D in the above embodiment, the selection unit 21D selects the action set satisfying the resilience requirements acquired by the first acquisition unit 20A among the action sets, as the resilience design information, based on the resilience indicator (KPI relative value) calculated for each of the action sets. However, for each group of the target system 40, the selection unit 21D selects the optimum resilience design information for that group.

The selection unit 21D may select the resilience design information similarly to the selection unit 20D in the above embodiment except that the action set satisfying the resilience requirements selected for each of the groups to which the nodes included in the target system 40 are classified is selected as the optimum resilience selection information for that group instead of the whole target system 40. The selection unit 21D may use the strictest (the highest evaluation value) resilience requirements among the resilience requirements of the nodes included in the group as the process target, as the resilience requirements used to determine whether the resilience requirements are satisfied. The selection unit 21D may perform this determination using the resilience requirements with the lowest evaluation value among the resilience requirements of the nodes included in the group as the process target.

The output control unit 21E outputs the resilience information selected by the selection unit 21D similarly to the output control unit 20E. However, the output control unit 21E outputs the resilience information for each group of the target system 40 selected by the selection unit 21D.

Similarly to the output control unit 20E, the output control unit 21E may output the resilience information selected by the selection unit 21D, and at least one of the resilience requirements acquired by the first acquisition unit 21A and the system constraint condition acquired by the second acquisition unit 21B. The output control unit 21E may further sort and output the resilience information selected by the selection unit 21D in the order of high-to-low constraint sufficiency degree represented by the constraint sufficiency score. The output control unit 21E may associate the resilience design information selected by the selection unit 21D with the above overall rank assigned to the resilience setting information and output the information.

Next, one example of the procedure of the information processing to be executed by the information processing device 10B in this embodiment is described.

Figure 13:
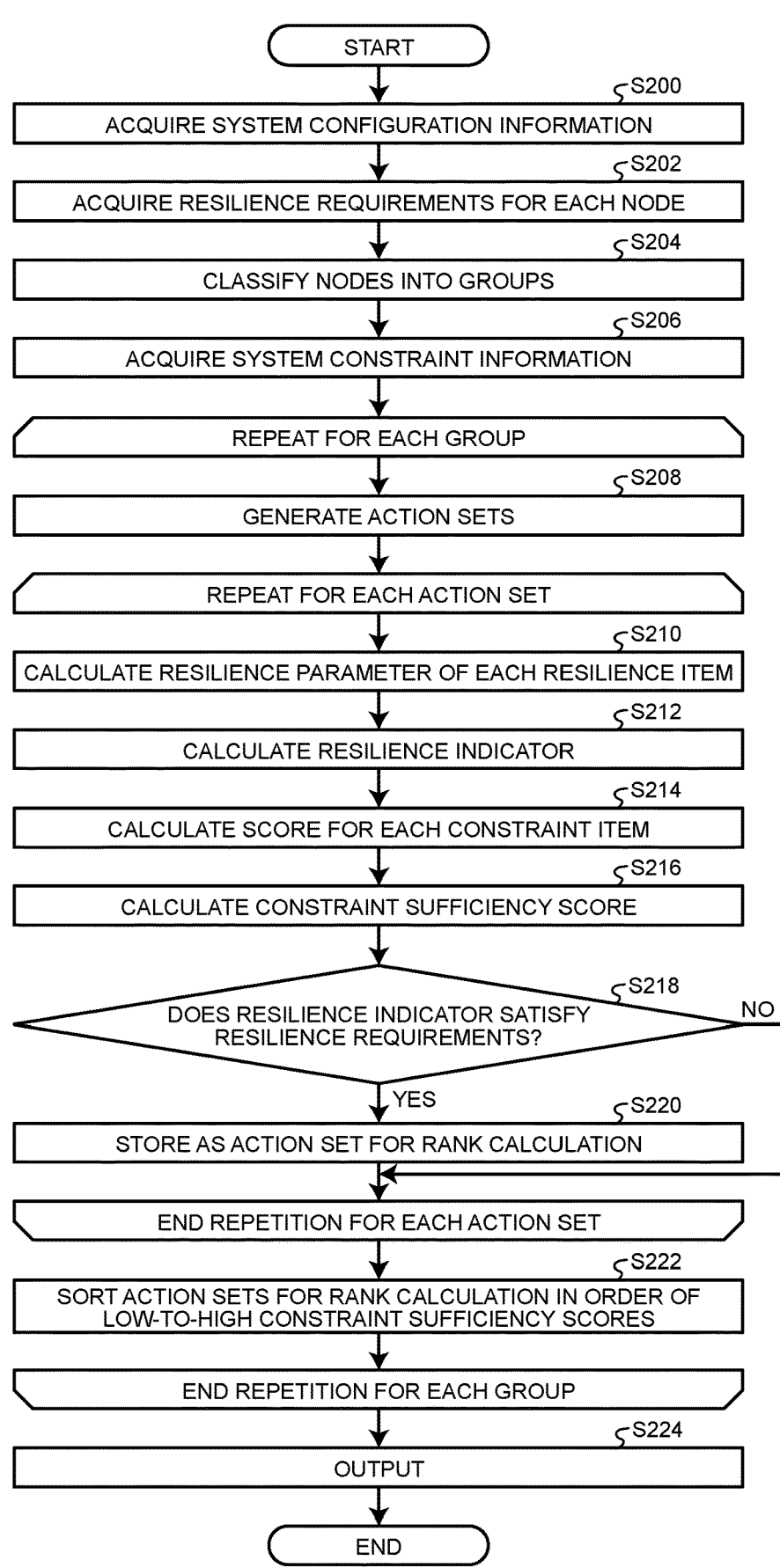
FIG. 13 is a flowchart expressing the procedure of information processing.

FIG. 13 is a flowchart expressing one example of the procedure of the information processing to be executed by the information processing device 10B in this embodiment.

The third acquisition unit 21F acquires system configuration information (step S200). For example, the user inputs the desired system configuration information by operating the UI unit 12. The third acquisition unit 21F acquires the system configuration information input by the user from the UI unit 12.

The first acquisition unit 21A acquires the resilience requirements for each node included in the target system 40 (step S202). For example, the user inputs the desired resilience requirements by operating the UI unit 12. The first acquisition unit 21A acquires the resilience requirements for each node that are input by the user, from the UI unit 12.

The classification unit 21G classifies the nodes included in the target system 40 into the groups, based on the resilience requirements for each of the nodes included in the target system 40 acquired at step S202 (step S204).

Then, the second acquisition unit 21B acquires the system constraint information for each group classified at step S204 (step S206). For example, the user inputs the desired system constraint information for each group by operating the UI unit 12. The second acquisition unit 21B acquires the system constraint information for each group input by the user from the UI unit 12.

Then, the processing unit 21 executes steps S208 to S222 for each of the groups classified at step S204.

For the group as the process target, the calculation unit 21C generates the action sets for which at least one of the number and the type of actions included is different, by using the actions registered in the cyber resilience catalog 14A (step S208).

Then, the calculation unit 21C and the selection unit 21D perform steps S210 to S222 for each of the action sets generated at step S208.

In detail, the calculation unit 21C calculates the resilience parameter that represents the improvement degree of each of the resilience items in a case where the action included in the action set as the process target is introduced in the target system 40 (step S210).

Then, the calculation unit 21C calculates the resilience indicator for the action set as the process target in the group as the process target using the value of each resilience parameter of the resilience item calculated at step S210 (step S212). As described above, for example, the calculation unit 21C calculates the KPI relative value as the resilience indicator.

Next, for the action set as the process target, the calculation unit 21C calculates the score representing the sufficiency degree of the constraint requirements for each constraint item in accordance with the influence parameter and the constraint requirement level for each constraint item represented by the system constraint information for the group as the process target acquired at step S206 (step S214).

Then, using the score calculated for each constraint item at step S214, the calculation unit 21C calculates the constraint sufficiency score that represents the sufficiency degree of the constraint represented by the system constraint information for the action set as the process target (step S216).

Next, the selection unit 21D determines whether the resilience indicator calculated at step S212 satisfies the strictest requirements among the resilience requirements acquired at step S202 for each of the nodes that belong to the group as the process target (step S218). If it is determined that the resilience requirements are not satisfied (No at step S218), the process for this action set is terminated. If it is determined that the resilience requirements are satisfied (Yes at step S218), the process advances to step S220.

At step S220, the selection unit 21D stores the action set as the process target determined to be Yes at step S218, in the storage unit 14 as the action set for rank calculation (step S220).

When the processing unit 21 performs the process at step S210 to step S220 for each of the action sets generated at step S208, the action set of the resilience indicator satisfying the resilience requirements is stored in the storage unit 14 as the action set for the rank calculation. At this time, the selection unit 21D may associate at least one of the resilience requirements used in the calculation of the action set, the system constraint information, the resilience indicator, the constraint sufficiency score, and the overall rank assigned in the order of high-to-low constraint sufficiency degree represented by the constraint sufficiency score with the action set and store the information in the storage unit 14.

When the processing unit 21 performs the process at step S210 to step S220 for each of the action sets generated at step S208, the action set satisfying the resilience requirements acquired at step S202 is selected as the optimum resilience design information for the target system 40.

The output control unit 21E sorts the action sets for rank calculation stored at step S220 in the order of low-to-high constraint sufficiency scores (step S222).

When the processing unit 21 performs the process at step S208 to step S222 for each group classified at step S204, for each of the groups to which the nodes included in the target system 40 are classified, the action set satisfying the resilience requirements of each group is selected as the optimum resilience design information for the group.

The output control unit 21E then outputs the action sets sorted by group at step S222 as the optimum resilience design information for each of the groups to which the nodes in the target system 40 are classified (step S224). This routine is then terminated.

As described above, the third acquisition unit 21F of the information processing device 10B in this embodiment acquires the system configuration information concerning the nodes included in the target system 40 and the flow of data between the nodes. The classification unit 21G classifies the nodes included in the target system 40 into the groups with the similar resilience requirements, based on the resilience requirements for each of the nodes included in the target system 40 acquired by the first acquisition unit 21A. The calculation unit 21C calculates resilience indicator for each of the action sets for each of the groups. The selection unit 21D selects as the resilience design information of each of the groups, the action set satisfying the resilience requirements among the action sets on the basis of the resilience indicator calculated for each of the action sets, for each of the groups.

Therefore, the information processing device 10B according to this embodiment can appropriately classify the target system 40 with mixed resilience requirements into the groups, and provide the resilience design information for each group.

Therefore, in addition to the effects of the above embodiment, the information processing device 10B according to this embodiment can provide the optimum resilience design information for each of the groups to which the nodes included in the target system 40 are classified.

Third Embodiment

This embodiment describes a mode of additionally generating and providing a code to be used in the implementation of the resilience design information in the target system 40.

Figure 14:
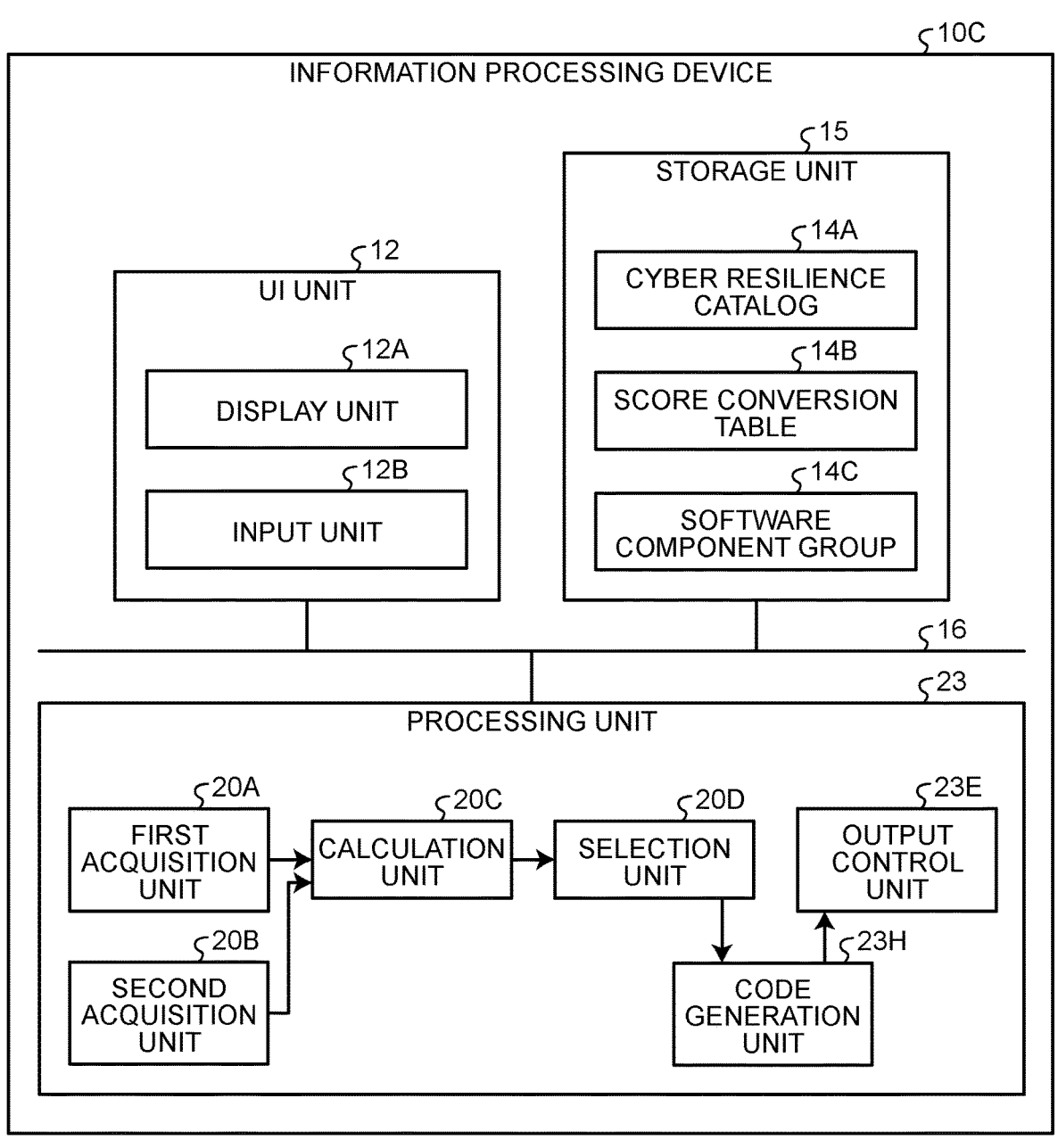
FIG. 14 is a schematic diagram of an information processing device.

FIG. 14 is a schematic diagram of one example of an information processing device 10C according to this embodiment.

The information processing device 10C includes the UI unit 12, a storage unit 15, and a processing unit 23. The information processing device 10C is similar to the information processing device 10 according to the above embodiment except that the information processing device 10C includes the storage unit 15 and the processing unit 23 instead of the storage unit 14 and the processing unit 20.

The storage unit 15 stores the cyber resilience catalog 14A, the score conversion table 14B, and a software component group 14C therein. The storage unit 15 is similar to the storage unit 14 in the above embodiment, except that the storage unit 15 additionally stores the software component group 14C therein.

The software component group 14C is a group of software components used in implementing the action into the target system 40. In the software component group 14C, a group of software components used in implementing each of the actions registered in the cyber resilience catalog 14A into the target system 40 is registered in advance.

The processing unit 23 includes the first acquisition unit 20A, the second acquisition unit 20B, the calculation unit 20C, the selection unit 20D, an output control unit 23E, and a code generation unit 23H. The processing unit 23 is similar to the processing unit 20 in the above embodiment except that the processing unit 23 additionally includes the code generation unit 23H.

The code generation unit 23H generates a code to be used for the implementation of the resilience design information in the target system 40, based on the resilience design information selected by the selection unit 20D.

The code may be the code used in the software and for the implementation of the resilience design information in the target system 40. The code is, for example, Infrastructure as Code (IaC), manifest, source code, etc.

The code generation unit 23H selects the software component, from the software component group 14C, that corresponds to the action included in the action set represented by the resilience design information selected by the selection unit 20D. The code generation unit 23H then generates the IaC that automates the integration of the selected software component into the target system 40 as the code. The code generation unit 23H generates the IaC for each action set selected by the selection unit 20D.

The output control unit 23E outputs the resilience information selected by the selection unit 20D similarly to the output control unit 20E in the above embodiment. The output control unit 23E may output the resilience information selected by the selection unit 20D, and at least one of the resilience requirements acquired by the first acquisition unit 20A and the system constraint condition acquired by the second acquisition unit 20B. The output control unit 23E may further sort the resilience information selected by the selection unit 20D in the order of high-to-low constraint sufficiency degree represented by the constraint sufficiency score and output the information. The output control unit 23E may associate the resilience design information selected by the selection unit 20D with the above overall rank assigned to the resilience setting information and output the information.

The output control unit 23E further outputs the IaC generated by the code generation unit 23H for each action set represented by the resilience design information selected by the selection unit 20D.

Next, one example of the procedure of the information processing to be executed by the information processing device 10C in this embodiment is described.

FIG. 15 is a flowchart expressing one example of the procedure of the information processing to be executed by the information processing device 10C in this embodiment.

The processing unit 23 of the information processing device 10C performs the process at steps S300 to S318 similarly to the processing unit 20 in the above embodiment. Steps S300 to S318 correspond to steps S100 to S118 in FIG. 9.

The code generation unit 23H of the information processing device 10C generates a code to be used for the implementation of the resilience design information in the target system 40, based on the resilience design information stored as the action set for rank calculation at step S316 (step S320). For example, the code generation unit 23H generates a code to be used for the implementation of the resilience design information in the target system 40 by generating the IaC for each action set represented by the resilience design information.

The output control unit 23E outputs the action sets sorted at step S318 as the optimum resilience design information for the target system 40, and outputs the IaC generated at step S320 (step S322). This routine is then terminated.

As described above, in the information processing device 10C in this embodiment, the code generation unit 23H generates the code to be used in the implementation of the resilience design information in the target system 40, based on the resilience design information.

Therefore, in addition to the effects of the above embodiment, the information processing device 10C in this embodiment can facilitate the implementation of the optimum resilience design information for the target system 40, into the target system 40.

Next, one example of a hardware configuration of the information processing device 10, the information processing device 10B, and the information processing device 10C of the above embodiments will be described.

Figure 16:
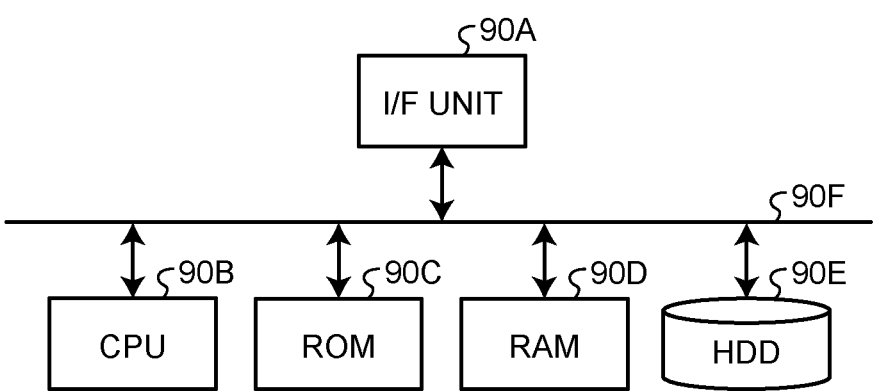
FIG. 16 is a hardware configuration diagram.

FIG. 16 is a hardware configuration diagram of one example of the information processing device 10, the information processing device 10B, and the information processing device 10C of the above embodiments.

The information processing device 10, the information processing device 10B, and the information processing device 10C in the above embodiments include a control device such as a central processing unit (CPU) 90B, a storage device such as a read only memory (ROM) 90C, a random access memory (RAM) 90D, and a hard disk drive (HDD) 90E, an I/F unit 90A corresponding to the interface with various devices, and a bus 90F to connect these units, and has a hardware configuration using a normal computer.

In the information processing device 10, the information processing device 10B, and the information processing device 10C in the above embodiments, the CPU 90B reads out computer programs from the ROM 90C onto the RAM 90D and executes the computer programs, such that the respective units are achieved on a computer.

The computer programs for executing each of the above processes to be executed by the information processing device 10, the information processing device 10B, and the information processing device 10C in the above embodiments may be stored in the HDD 90E. The computer programs for executing each of the above processes to be executed by the information processing device 10, the information processing device 10B, and the information processing device 10C in the above embodiments may be provided by being incorporated in advance in the ROM 90C.

The computer programs for executing each of the above processes to be executed by the information processing device 10, the information processing device 10B, and the information processing device 10C in the above embodiments may be stored in a computer-readable storage medium such as a CD-ROM, a CD-R, a memory card, a digital versatile disc (DVD), or a flexible disk (FD) as files in an installable or executable format and provided as a computer program product. The computer programs for executing each of the above processes to be executed by the information processing device 10, the information processing device 10B, and the information processing device 10C in the above embodiments may be provided by being stored on a computer connected to a network such as the Internet and downloaded through the network. The computer programs for executing each of the above processes to be executed by the information processing device 10, the information processing device 10B, and the information processing device 10C in the above embodiments may alternatively be provided or distributed through a network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device, comprising:
one or more hardware processors configured to:
   acquire a resilience requirement for a target system including a plurality of nodes in communication via a network;
   generate a plurality of action sets for which at least one of a type of an action and a number of actions for resilience is different, each action set comprising one or more security actions to be performed against cyberattacks on the target system, the one or more security actions being selected from a cyber resilience catalog including one or more of firewall, anti-virus, Security Operations Center (SOC), backup or restore, fallback, and duplication;
   calculate, for each of the plurality of action sets, a resilience indicator of the target system to which an action set is applied, based on resilience parameters representing improvement degrees of resilience items;
   select, as resilience design information, the action set satisfying the resilience requirement among the plurality of action sets, based on the resilience indicator;
   generate a code to implement the action set represented by the resilience design information by generating Infrastructure as Code (IaC) for the action set; and
   implement the action set in the target system by applying the generated code to facilitate an optimum resilience design information for the target system, wherein
   the resilience items include at least one of an attack success rate, an operation function, or a stop period, the resilience indicator is calculated using an integrated value of a function stop rate and the attack success rate within a return time, the function stop rate represents a proportion of functions in the target system that are stopped at a given time, and is defined as 1 minus a function operation rate, and the function operation rate is defined as a proportion of functions in the target system that are operating at a given time, expressed as a value between 0 and 1, with 1 indicating all functions are operating and 0 indicating all functions are stopped.

2. The information processing device of claim 1, wherein the one or more hardware processors are further configured to:

acquire system constraint information representing a constraint requirement level required for each constraint item for the target system;

calculate, for each action set, a score representing a sufficiency degree of a constraint requirement for each constraint item in accordance with an influence parameter representing an influence degree, other than the resilience, occurring to the target system in a case where the action is introduced in the target system, and the acquired constraint requirement level for each constraint item;

calculate a constraint sufficiency score representing a sufficiency degree of a constraint represented by the system constraint information for each action set using the score; and select the action set for which the resilience indicator satisfies the resilience requirement and the constraint sufficiency score satisfies a predetermined condition, as the resilience design information.

3. The information processing device of claim 1, wherein the one or more hardware processors are further configured to output the resilience design information.

4. The information processing device of claim 1, wherein the one or more hardware processors are further configured to:

acquire system configuration information concerning a plurality of nodes included in the target system and a flow of data between the nodes; and classify the nodes included in the target system into a plurality of groups with a similar resilience requirement, based on the resilience requirement for each of the nodes included in the target system;

calculate the resilience indicator of each of the action sets for each of the groups; and select, as the resilience design information of each of the groups, the action set satisfying the resilience requirement among the action sets, based on the resilience indicator calculated for each of the action sets, for each of the groups.

5. The information processing device of claim 4, wherein the one or more hardware processors are configured to classify the nodes included in the target system into the groups such that an attack surface is minimized, based on the system configuration information.

6. An information processing method implemented by a computer, the method comprising:

acquiring a resilience requirement for a target system including a plurality of nodes in communication via a network;

generating a plurality of action sets for which at least one of a type of an action and a number of actions for resilience is different, each action set comprising one or more security actions to be performed against cyber-attacks on the target system, the one or more security actions being selected from a cyber resilience catalog including one or more of firewall, anti-virus, Security Operations Center (SOC), backup or restore, fallback, and duplication;

calculating, for each of the plurality of action sets, a resilience indicator of the target system to which an action set is applied, based on resilience parameters representing improvement degrees of resilience items;

selecting, as resilience design information, the action set satisfying the resilience requirement among the plurality of action sets, based on the resilience indicator;

generating a code to implement the action set represented by the resilience design information by generating Infrastructure as Code (IaC) for the action set; and implementing the action set in the target system by applying the generated code to facilitate an optimum resilience design information for the target system, wherein the resilience items include at least one of an attack success rate, an operation function, or a stop period, the resilience indicator is calculated using an integrated value of a function stop rate and the attack success rate within a return time, the function stop rate represents a proportion of functions in the target system that are stopped at a given time, and is defined as 1 minus a function operation rate, and the function operation rate is defined as a proportion of functions in the target system that are operating at a given time, expressed as a value between 0 and 1, with 1 indicating all functions are operating and 0 indicating all functions are stopped.

7. An information processing program product having a non-transitory computer readable medium including programmed instructions, wherein the instructions, when executed by a computer, cause the computer to execute:

acquiring a resilience requirement for a target system including a plurality of nodes in communication via a network;

generating a plurality of action sets for which at least one of a type of an action and a number of actions for resilience is different, each action set comprising one or more security actions to be performed against cyber-attacks on the target system, the one or more security actions being selected from a cyber resilience catalog including one or more of firewall, anti-virus, Security Operations Center (SOC), backup or restore, fallback, and duplication;

calculate, for each of the plurality of action sets, a resilience indicator of the target system to which an action set is applied, based on resilience parameters representing improvement degrees of resilience items;

selecting, as resilience design information, the action set satisfying the resilience requirement among the plurality of action sets, based on the resilience indicator;

generate a code to implement the action set represented by the resilience design information by generating Infrastructure as Code (IaC) for the action set; and implement the action set in the target system by applying the generated code to facilitate an optimum resilience design information for the target system, wherein the resilience items include at least one of an attack success rate, an operation function, or a stop period,

the resilience indicator is calculated using an integrated
   value of a function stop rate and the attack success
   rate within a return time,
the function stop rate represents a proportion of func-
   tions in the target system that are stopped at a given
   time, and is defined as 1 minus a function operation
   rate, and
the function operation rate is defined as a proportion of
   functions in the target system that are operating at a
   given time, expressed as a value between 0 and 1,
   with 1 indicating all functions are operating and 0
   indicating all functions are stopped.

\* \* \* \* \*